United States Patent
Gonzalez et al.

(10) Patent No.: US 9,864,664 B2
(45) Date of Patent: Jan. 9, 2018

(54) DIAGNOSTICS METHOD FOR DEVICE FOR CONTROLLING A MOTOR VEHICLE POWERED BY AN ELECTRIC MOTOR, AND ASSOCIATED DEVICE

(71) Applicants: CONTINENTAL AUTOMOTIVE FRANCE, Toulouse (FR); CONTINENTAL AUTOMOTIVE GMBH, Hannover (DE)

(72) Inventors: Alain Gonzalez, Castelginest (FR); Jeremy Pasquier, Rieux (FR); Stephan Vales, Eaunes (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 14/365,666

(22) PCT Filed: Dec. 17, 2012

(86) PCT No.: PCT/EP2012/005209
§ 371 (c)(1),
(2) Date: Jun. 16, 2014

(87) PCT Pub. No.: WO2013/091820
PCT Pub. Date: Jun. 27, 2013

(65) Prior Publication Data
US 2014/0343779 A1 Nov. 20, 2014

(30) Foreign Application Priority Data
Dec. 21, 2011 (FR) ..................... 11 03966

(51) Int. Cl.
*B60L 9/00* (2006.01)
*G06F 11/22* (2006.01)
*B60L 3/00* (2006.01)

(52) U.S. Cl.
CPC ............... *G06F 11/221* (2013.01); *B60L 3/00* (2013.01); *Y02T 90/16* (2013.01)

(58) Field of Classification Search
CPC ....... G06F 11/221; B60R 16/02; B60R 25/10; H05B 37/029; H02J 7/00; H04L 12/28; Y02B 20/48
(Continued)

(56) References Cited

U.S. PATENT DOCUMENTS 4,951,283 A * 8/1990 Mastrocola ............. G06F 11/22 714/43
5,463,294 A * 10/1995 Valdivia .................... B60L 7/14 318/432

(Continued)

FOREIGN PATENT DOCUMENTS

| CN | 1047755 | 12/1999 |
| FR | 2 875 551 | 3/2006 |
| JP | 2000 006737 | 1/2000 |

OTHER PUBLICATIONS

International Search Report dated Feb. 4, 2013, corresponding to PCT/EP2012/005209.

*Primary Examiner* — Shardul Patel
(74) *Attorney, Agent, or Firm* — Young & Thompson

(57) ABSTRACT

A diagnostic method for a control device of a motor vehicle with an electric propulsion motor, including: an electronic control unit (500); a data communication bus (Tx; Rx) connecting at least the electronic control unit (500) and a controller of the electric motor; and a controller (510) of the data communication bus (Tx; Rx); includes the following steps:

(Continued)

Figure 1:
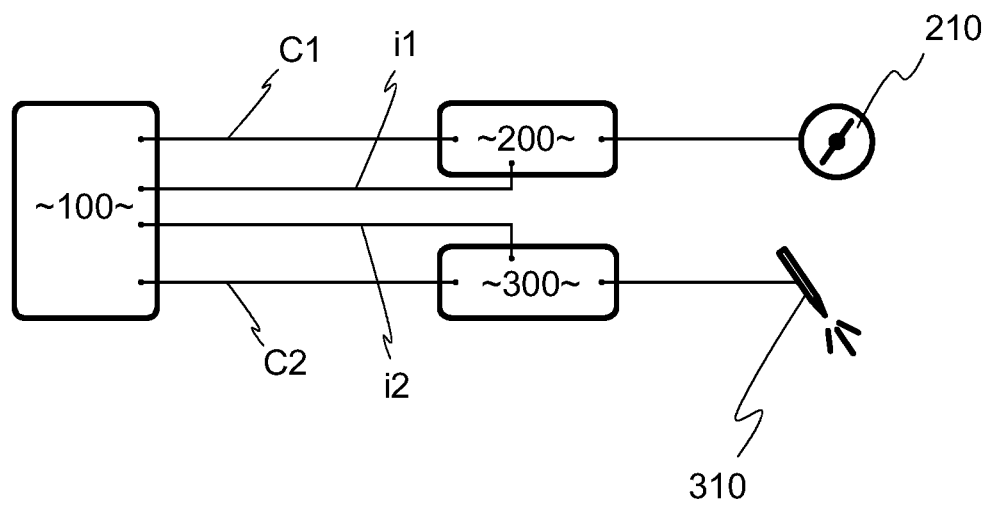

the disabling of the controller (510) of the data communication bus (Tx; Rx) by the electronic control unit (500), the transmission by the electronic control unit of a signal frame on the data communication bus (Tx; Rx), the reading by the electronic control unit of the signals traveling along the data communication bus (Tx; Rx), and the issue of the positive safety diagnosis if the signal frame is not read by the electronic control unit.

2 Claims, 1 Drawing Sheet

(58) Field of Classification Search
USPC .................................................. 701/1, 22, 36
See application file for complete search history.

(56) References Cited

U.S. PATENT DOCUMENTS

| | | | | |
|---|---|---|---|---|
| 6,430,634 | B1* | 8/2002 | Mito | G05B 19/042 710/100 |
| 7,061,202 | B2* | 6/2006 | Sunaga | B60H 1/00835 165/202 |
| 7,392,122 | B2* | 6/2008 | Pillar | A62C 27/00 701/22 |
| 8,175,791 | B2* | 5/2012 | Lecole | F02N 11/0825 701/112 |
| 2002/0120376 | A1* | 8/2002 | Miller | G05G 1/405 701/36 |
| 2002/0148675 | A1* | 10/2002 | Higashira | B62D 5/0406 180/446 |
| 2006/0208923 | A1* | 9/2006 | Tauchi | G08G 1/161 340/902 |
| 2006/0212135 | A1* | 9/2006 | Degoul | B60T 8/321 700/9 |
| 2006/0293831 | A1* | 12/2006 | Yano | F02D 11/107 701/114 |
| 2007/0174684 | A1* | 7/2007 | Englert | G07C 5/008 714/12 |
| 2009/0216430 | A1* | 8/2009 | Lecole | F02N 11/10 701/112 |
| 2010/0097040 | A1* | 4/2010 | Boisvert | F15B 7/008 322/40 |
| 2010/0250053 | A1* | 9/2010 | Grill | G07C 5/085 701/31.4 |
| 2011/0054768 | A1* | 3/2011 | Sullivan | B60W 10/06 701/123 |
| 2011/0285201 | A1* | 11/2011 | Peuser | B60R 16/03 307/10.1 |
| 2011/0320081 | A1* | 12/2011 | Ogura | B60L 1/00 701/22 |
| 2013/0134912 | A1* | 5/2013 | Khalil | H02P 25/08 318/400.11 |
| 2013/0234669 | A1* | 9/2013 | Huang | H02J 7/34 320/126 |
| 2013/0307577 | A1* | 11/2013 | Falkenstein | G01R 31/34 324/765.01 |

* cited by examiner

DIAGNOSTICS METHOD FOR DEVICE FOR CONTROLLING A MOTOR VEHICLE POWERED BY AN ELECTRIC MOTOR, AND ASSOCIATED DEVICE

BACKGROUND OF THE INVENTION

Field of the Invention

The invention is applicable to the field of engine control, and more precisely to the field of motor control for electric motor vehicles. Even more specifically, the invention relates to means for diagnosis and safety protection of the control devices of the propulsion motors of said electric vehicles.

Description of the Related Art

Electric motor vehicles are becoming increasingly common on our roads. It is logical to expect them to meet the same safety standards as motor vehicles fitted with internal combustion engines, which make up the vast majority of the present motor vehicle fleet. These motor vehicles fitted with internal combustion engines are at present each fitted with an electronic engine control device. Using data obtained from various sensors, an electronic computer integrated into the electronic engine control device determines the optimum operating conditions in real time for the internal combustion engine, and acts on various actuators to modify the operating parameters of said engine in order to achieve optimized operation. Numerous components of the vehicle are therefore provided with sensors in order to provide the most detailed information possible to the electronic engine control device.

Consequently, there is, for example, no longer any real mechanical link between the torque command given by the driver of the motor vehicle (via an accelerator pedal in the great majority of cases) and the actuators which control the internal combustion engine of the vehicle so that it actually delivers the requested torque. In fact, the accelerator pedal, which in the past was linked directly to the actuator (the butterfly valve in the carburetor), is no longer linked in this way. At present, the pedal is fitted with a position sensor which determines the nature of the "engine torque request" made by the driver, and transmits this information to the electronic motor control device. According to the position of the accelerator pedal and of the kinematic for varying this position (sudden pressing or release of the pedal, constant pressure, progressive pressure, etc.), the engine control computer then determines the exact operating parameters of the internal combustion engine and transmits them to the actuators (injectors, electric throttle valve, turbo-compressor control valve, exhaust gas recirculation valve, etc.).

This technological development has given rise to a safety problem. This is because, when a mechanical link is present between the accelerator pedal and the actuator (the throttle valve), the simple fact that the driver releases his pressure on the pedal automatically causes a deceleration of the vehicle. With an electronic control system, there is no way of being sure of the same effect at the outset. There is then a need to ensure that the on-board electronic system is at least as reliable as the mechanical link of the prior art.

Consequently, in internal combustion engines provided with electronic engine control, it has been necessary to develop a strategy for ensuring that the throttle cut actually takes place. This strategy can be summarized as follows. When the driver releases the pressure on the accelerator pedal (or when the engine control device no longer detects a signal from the position sensor of the accelerator pedal), the engine control device controls the electric throttle valve and the injectors, and places them in positions where engine deceleration conditions are achieved. Thus, in case of emergency (rapid release of the accelerator pedal) or failure of the position sensor of the accelerator pedal, the two actions are executed and, if one of the two actuators does not respond, the second still achieves the desired effect. For this purpose (see FIG. 1), the electronic engine control unit 100 (also called ECU, the English abbreviation of "Engine Control Unit") acts via the control line C1 on an electronic throttle valve controller 200, on the one hand, and on an electronic injector controller 300 via the control line C2, on the other hand. By disabling these two electronic controllers 200 and 300, the electronic engine control unit 100 cuts off or greatly reduces the flow rate of the fuel injectors 310 and places the throttle valve 210 in a position that limits the inflow of fuel. It will be readily understood that, if one of the two aforementioned electronic controllers 200 and 300 does not obey the commands of the electronic unit 100, the effect is still achieved. This is because, when the quantity of fuel or combustion agent introduced into an internal combustion engine is reduced, the engine speed of said internal combustion engine will implicitly be made to decrease.

A test procedure is performed at the time of switch-on. This may take place as follows. The electronic unit 100 initially renders the two electronic controllers 200 and 300 inactive by sending them a deactivation command via the deactivation lines i1 and i2 respectively. When the two electronic controllers 200 and 300 have been deactivated, the electronic unit 100 then sends a command to the electronic controllers of the actuators in question and checks that said actuators have not responded to the request, since the communication has been deactivated. The diagnosis of the reliability of the deactivation (or disabling) of the controllers is then possible.

This deactivation procedure may also be used in case of emergency, but in this case the internal combustion engine ceases to be supplied with fuel or combustion agent and then stalls.

The strategy described above can be transposed to an electric motor. In an electric motor, the torque command (also measured by a position sensor located on the accelerator pedal) that the electronic motor control unit wishes to have executed by the electric motor is sent along a data communication bus (for example, a CAN bus, CAN being the English abbreviation for "Controller Area Network"). The data communication bus transmits this instruction to the electric motor controller. To provide safety protection, it is possible to act on the electric motor controller and/or on the data communication network. During the test of this safety device at the time of switch-on by the user, the data communication bus must be interrupted and a command must be sent in order to check that the command is not executed and that the safety device is indeed effective. Unfortunately, the deactivation and activation of the data communication bus are actions which take a great deal of time, and the user is not prepared to wait for the time required for the execution of these test steps. Furthermore, the deactivation of the data communication bus interferes not only with the diagnostics function but also with all the devices connected to said data communication bus.

SUMMARY OF THE INVENTION

The object of the invention is therefore to propose a method of safety protection of electric motors which is free of these drawbacks.

For this purpose, the invention proposes a diagnostic method for a control device of a motor vehicle with an electric propulsion motor including:
- an electronic control unit,
- a data communication bus connecting at least the electronic control unit and a control driver of the electric motor,
- a control driver of the data communication bus.

The invention is remarkable in that the method comprises the following steps:
- the disabling of the control driver of the data communication bus by the electronic control unit,
- the transmission by the electronic control unit of a signal frame on the data communication bus,
- the reading by the electronic control unit of the signals traveling along the data communication bus,
- the issue of the positive safety diagnosis if the signal frame is not read by the electronic control unit.

Thus, assurance is provided that the control of the electric motor can be cut if necessary.

Advantageously, the transmitted signal frame does not correspond to a standard frame of the data communication bus protocol. Consequently, the correct operation of the whole vehicle is not disrupted if, by chance, the disabling of the controller of the data communication bus is not followed by any effects.

In one embodiment, the signal frame is limited to a test bit. This provides further assurance that the signal frame will not be interpreted as a command, and will, at most, be perceived as a parasitic signal on the communication bus by the devices which are connected thereto but which are unable to interpret it as a test of the disabling of the communication bus.

The invention is also applicable to a control device of a motor vehicle with an electric motor including:
- an electronic control unit,
- a data communication bus connecting at least the electronic control unit and a control driver of the electric motor,
- a control driver of the data communication bus, said device comprising:
- means for the disabling of the control driver of the data communication bus by the electronic control unit,
- means for the transmission by the electronic control unit of a signal frame on the data communication bus,
- means for the reading by the electronic control unit of the signals traveling along the data communication bus,
- means for issuing the positive safety diagnosis if the signal frame is not read by the electronic control unit.

BRIEF DESCRIPTION OF THE DRAWING FIGURES

Figure 2:
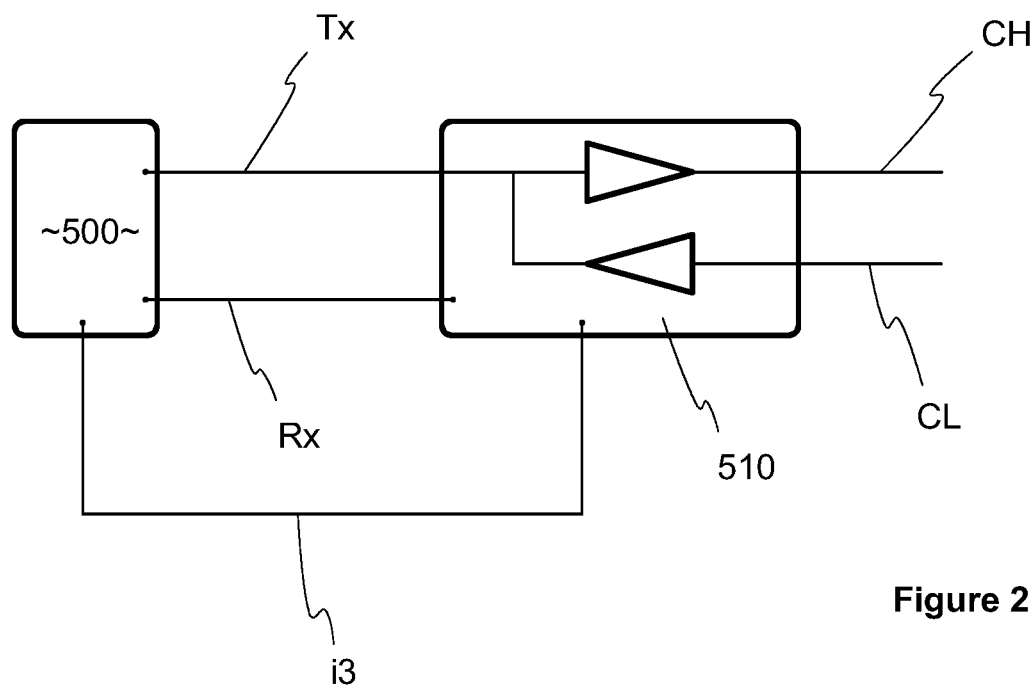

The invention will be more readily understood from the following description. This description is purely illustrative and is to be read with reference to the attached drawings, in which:

FIG. 1 shows a schematic representation of a safety protection device for an internal combustion engine having an electronic engine control device according to the prior art, FIG. 2 shows a schematic representation of a safety protection device for an electric propulsion motor having an electronic motor control device according to the invention.

DETAILED DESCRIPTION OF THE INVENTION

The method according to the invention uses a plurality of hardware or software components and a plurality of agents to which reference will be made in the rest of the description. In the description, actions are assigned to devices or programs: this means that these actions are executed by a microprocessor of this device or of the device including the program, said microprocessor then being controlled by instruction codes recorded in a memory of the device. These instruction codes enable the resources of the device to be used, and therefore permit the execution of the action undertaken.

FIG. 2 shows a possible embodiment, not in any way limiting, of the invention.

The electronic control unit (500) of the control device of a motor vehicle with an electric propulsion motor (not shown) is connected to a data communication bus (Tx, Rx) which enables it to control the electric motor of said vehicle. In the example described below, the data communication bus is of the CAN bus type, which is very widely used in the motor vehicle field at present. As is known, the electronic control unit (500) can transmit commands on a transmission channel (Tx) and/or read data on a reception channel (Rx). This data communication bus (Tx, Rx) is not exclusively dedicated to the electronic control unit (500) and other data may travel along it, each having an identifier according to the exchange protocol of the data communication bus (Tx, Rx).

This data communication bus (Tx, Rx) is also connected to a control driver of the electric motor, so that the electronic control unit (500) can send these operating instructions to said electric motor.

To enable the operation of the data communication bus (Tx, Rx) to be managed correctly, the bus is provided with a control driver (510), which is itself connected to the two communication wires, namely the wire called "CAN HIGH", having the reference CH in FIG. 2, and the wire called "CAN LOW", having the reference CL. Since the operating principles of a CAN bus are not the subject of the present invention, and are known to those skilled in the art, they will not be described here n further detail.

In order to overcome the problems of the test period encountered by the prior art, the invention proposes that the data communication bus (Tx, Rx) should not be switched off during the test phase conducted before each start of the vehicle. Thus the exchanges that are required to take place on it are not delayed by the time taken to stop and then restart said data communication bus (Tx, Rx). For this purpose, the invention proposes the following procedure:

The electronic control unit (500) disables the control driver (510) of the data communication bus (Tx, Rx) via the disabling channel (i3). At this stage, no frame transmitted by the electronic control unit (500) is considered to be able to travel on the data communication bus (Tx, Rx). In a second step of the method, the electronic control unit (500) transmits a test signal frame to the data communication bus (Tx, Rx). Preferably, this frame does not correspond to a format recognized by the other devices connected to the data communication bus (Tx, Rx), so that there is no risk of converting a test frame into an action command that may prove harmful. Advantageously, the invention proposes that the test signal frame should be limited to a single test bit. Thus the risk of undesired action will be zero, the single test bit being interpreted by the other devices connected to the data communication bus (Tx, Rx) as a parasitic noise.

However, the electronic control unit (500) knows the nature and content of the transmitted signal frame and will then monitor the data communication bus (Tx, Rx) in order to detect whether this signal frame is present or not.

If the signal frame is present, this means that the disabling of the control driver (510) of the data communication bus (Tx, Rx) via the disabling channel (i3) has not been effective, and an alert code is then raised, because the safety of the engine control is no longer ensured. This code may either generate the immobilization of the vehicle even before it has moved (since the test is generally conducted during switch-on), or display an emergency message on the dashboard of the motor vehicle, requesting intervention by a specialist. In terms of safety, the immediate immobilization of the vehicle is preferred, although this does not prevent the display of an explanatory message on the dashboard of the motor vehicle.

If the signal frame is not present on the data communication bus (Tx, Rx), the diagnosis of correct operation of this safety function is given and the motor vehicle can be driven. At this point, it will certainly be possible to stop the electric propulsion motor in case of emergency. Similarly, at the time of a sudden release of the accelerator pedal, the electronic control unit (500) may use this method, regardless of any emergency criterion in this case.

The invention is not limited to the embodiment described. It is entirely possible to generalize the diagnostic method to any type of electric motor, and not only to the electric propulsion motor, provided that the data communication bus is present.

In the claims, the term "comprise" does not exclude other elements or other steps. The indefinite article "a", "an" does not exclude the plural. The various characteristics described and/or claimed may advantageously be combined. Their presence in the description or in various dependent claims does not exclude this possibility. The reference symbols are not to be interpreted as limiting the scope of the invention.

The invention claimed is:

1. A method comprising: A diagnostic method for a control device of a motor vehicle with an electric propulsion motor, comprising: an electronic control unit, a data communication bus for communication between at least the electronic control unit and a control driver of the electric motor, a control driver of the data communication bus, including the following steps: inhibiting the control driver of the data communication bus for communication by the electronic control unit, emitting by the electronic control unit of a signal frame on the data communication bus for communication which does not correspond to a standard frame of the protocol of the data communication bus for communication, reading by the electronic control unit of the signals traveling along the data communication bus for communication, and setting up a positive safety diagnosis if the signal frame is not read by the electronic control unit.

2. The method according to claim 1, wherein the signal frame is limited to a test bit.

* * * * *